Figure 3:
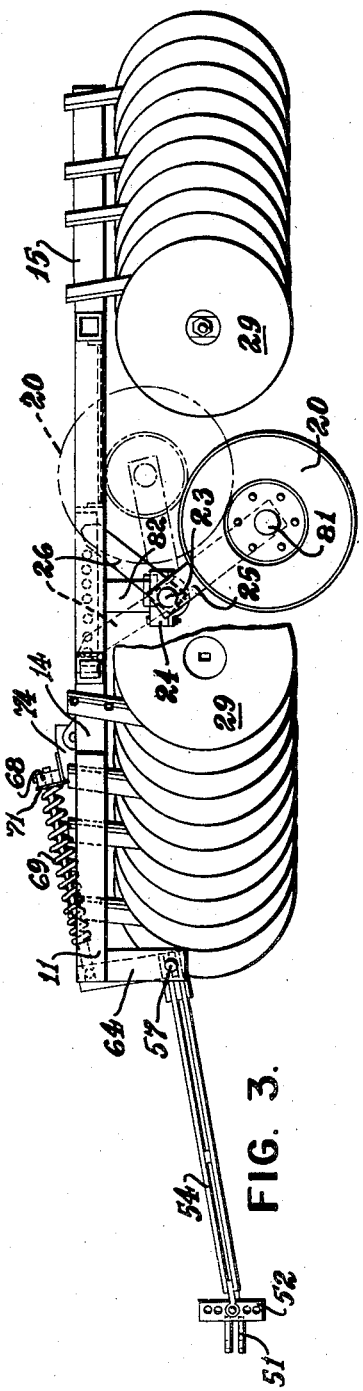

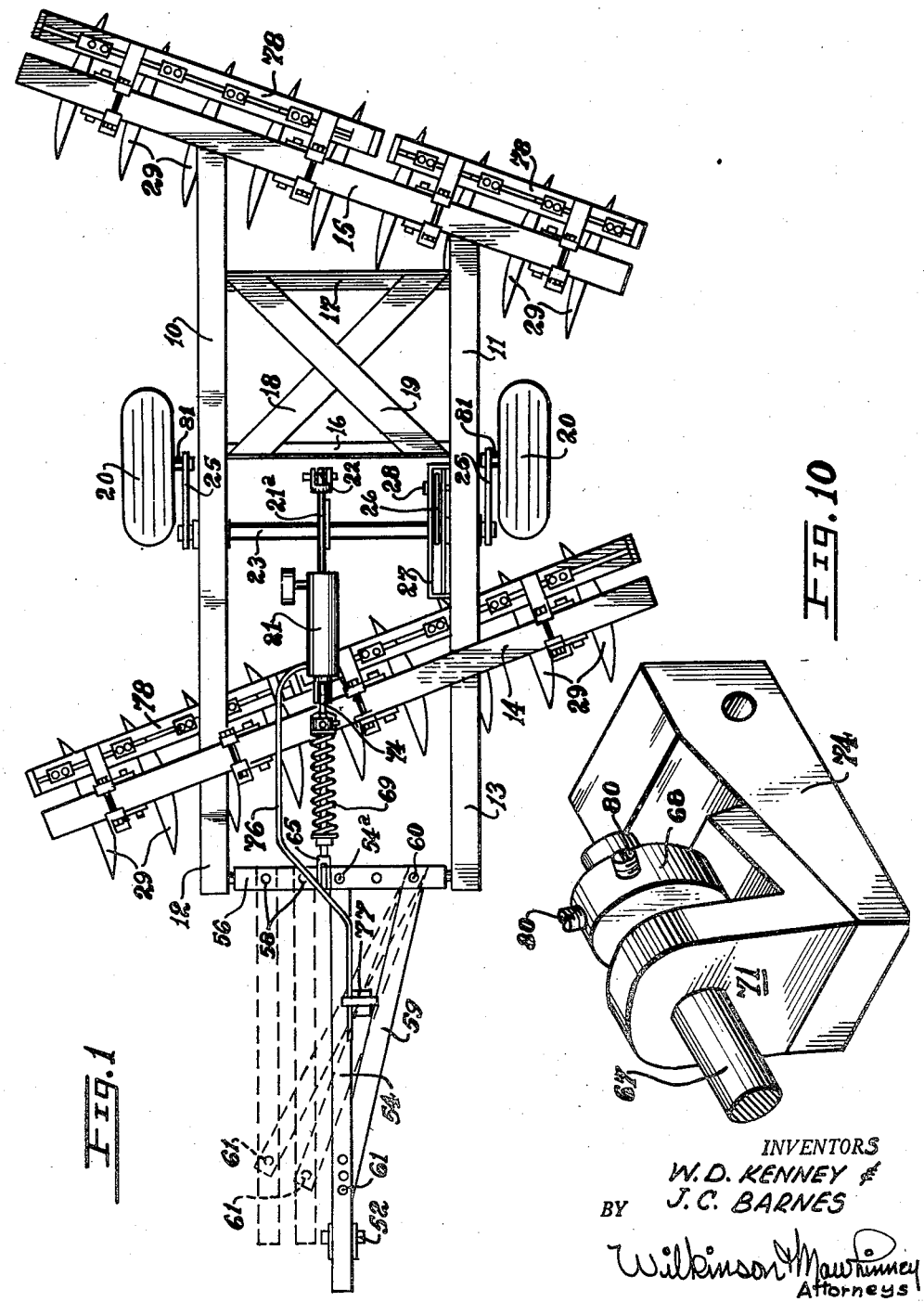
INVENTORS
W. D. KENNEY &
J. C. BARNES

Oct. 28, 1958 W. D. KENNEY ET AL 2,857,724
HARROW FRAME, LEVELING DEVICE THEREFOR, AND
DISC ASSEMBLY AND MOUNTING
Filed May 20, 1953 5 Sheets-Sheet 2

INVENTORS
W. D. KENNEY &
BY J. C. BARNES

Wilkinson Mawhinney
Attorneys

Oct. 28, 1958   W. D. KENNEY ET AL   2,857,724
HARROW FRAME, LEVELING DEVICE THEREFOR, AND
DISC ASSEMBLY AND MOUNTING
Filed May 20, 1953   5 Sheets-Sheet 3
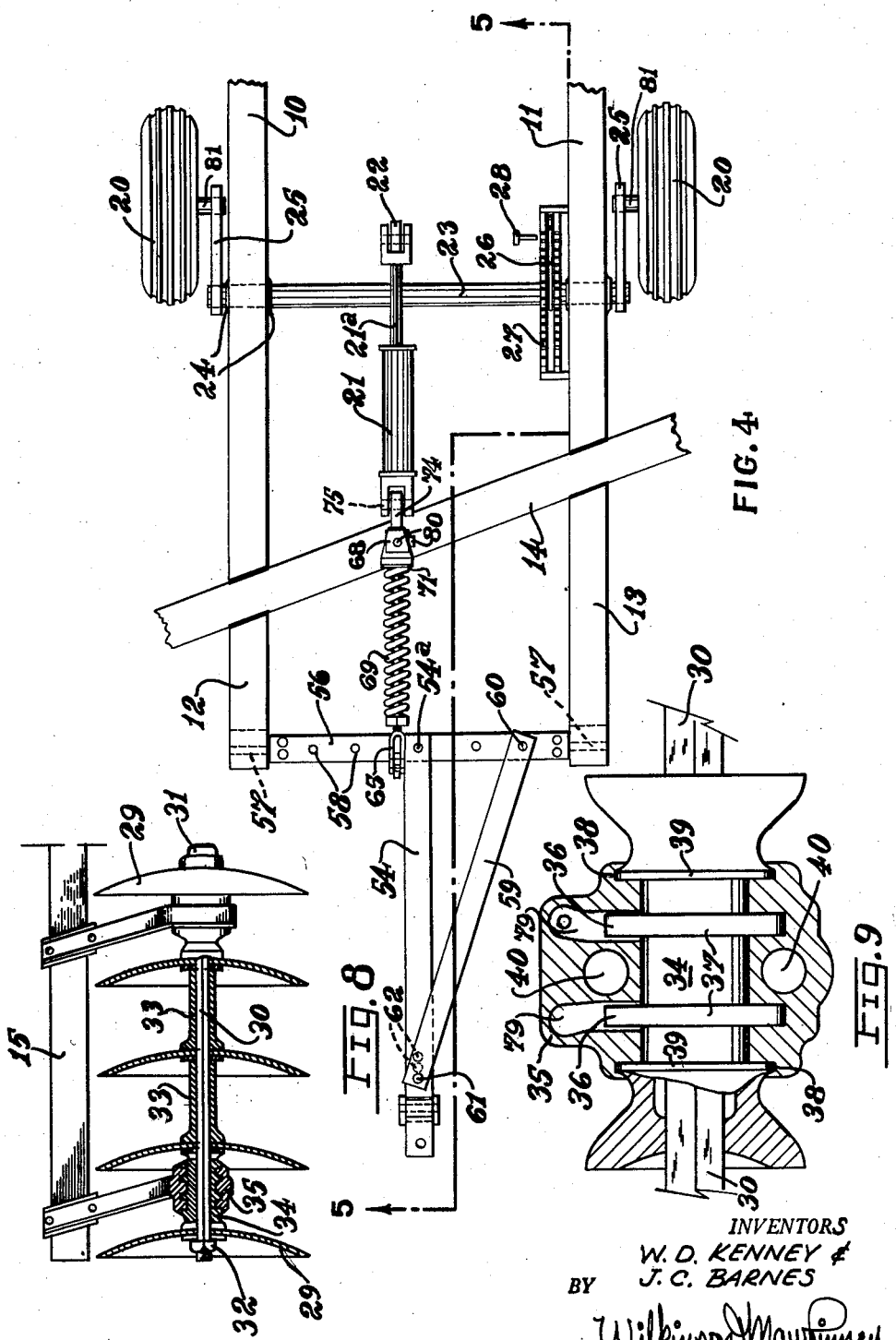
INVENTORS
W. D. KENNEY &
BY  J. C. BARNES
Wilkinson&Mawhinney
Attorneys Oct. 28, 1958     W. D. KENNEY ET AL     2,857,724
HARROW FRAME, LEVELING DEVICE THEREFOR, AND
DISC ASSEMBLY AND MOUNTING
Filed May 20, 1953     5 Sheets-Sheet 4
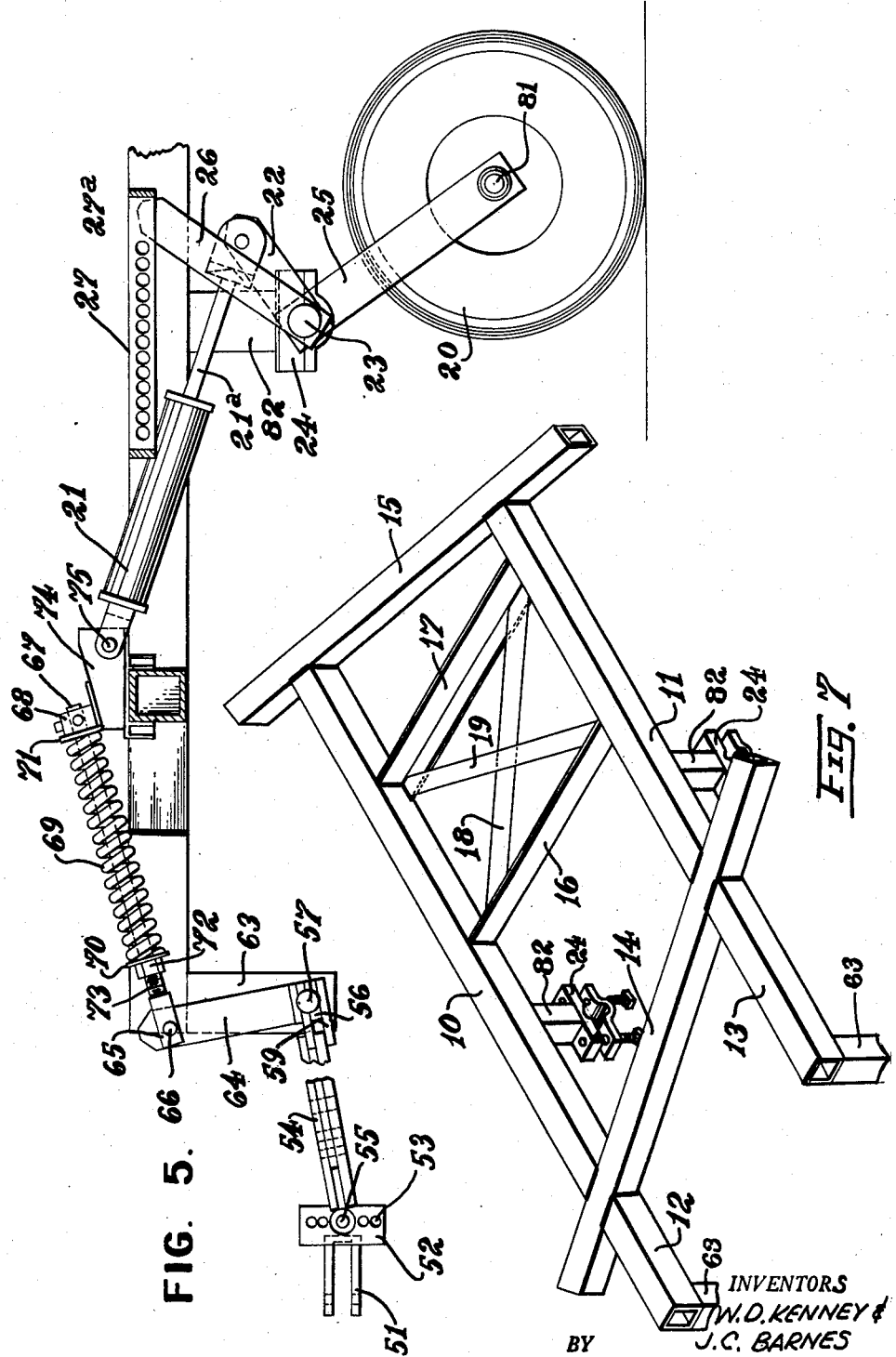
INVENTORS
W. D. KENNEY &
J. C. BARNES
BY Wilkinson Mawhinney
Attorneys Oct. 28, 1958  W. D. KENNEY ET AL  2,857,724
HARROW FRAME, LEVELING DEVICE THEREFOR, AND
DISC ASSEMBLY AND MOUNTING
Filed May 20, 1953  5 Sheets-Sheet 5

INVENTORS
W. D. KENNEY &
J. C. BARNES
BY Wilkinson Mawhinney
ATTORNEY

United States Patent Office

2,857,724
Patented Oct. 28, 1958

2,857,724

HARROW FRAME, LEVELING DEVICE THEREFOR, AND DISC ASSEMBLY AND MOUNTING

William D. Kenney and Julius C. Barnes, Columbus, Ga., assignors to Columbus Iron Works Company, Columbus, Ga., a corporation of Georgia Application May 20, 1953, Serial No. 356,158

6 Claims. (Cl. 55—73)

The present invention relates to harrow frames, leveling devices therefor and disc assemblies and mountings, and has for an object to provide an improved construction of frame for harrows or other agricultural, or in fact any other vehicles in which a minimum number of tubular members are integrated into a simple, inexpensive, light weight, extremely strong framework requiring no bracing or strengthening elements, thus contributing to the simplicity of the structure which renders it more adaptable for receiving in an adjustable manner the clamps by which the disc assemblies are secured to such frame.

Another object of the invention is to provide a gang assembly of novel form and construction in which the disc gangs are easily and quickly mounted to the frame and adjustable along the same to any desired position without interference from the frame and which arrangement provides flexibility to a high degree in mounting gangs of different disc sizes and different disc numbers, in different disc spacings whereby the machine may be quickly arranged and rearranged for any particular work required by it simply by an interchangeability of the parts of the gang assemblies.

A further object of the invention is to provide a wheel mount for the machine including a novel form of device for retaining the wheels at various elevations with respect to the frame to the end of regulating the depth of penetration of the discs into the ground.

A still further object of the invention is to provide a leveling device acting in conjunction with the tractor hitch to maintain the frame horizontal and level or at a desired tilt of inclination, the leveling device being adjustable for this purpose.

With the foregoing and other objects in view, the invention will be more fully described hereinafter, and will be more particularly pointed out in the claims appended hereto.

Figure 2:
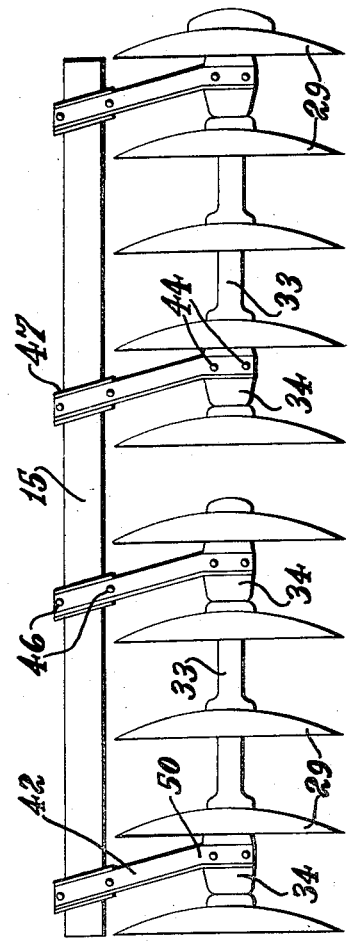
Figure 6:
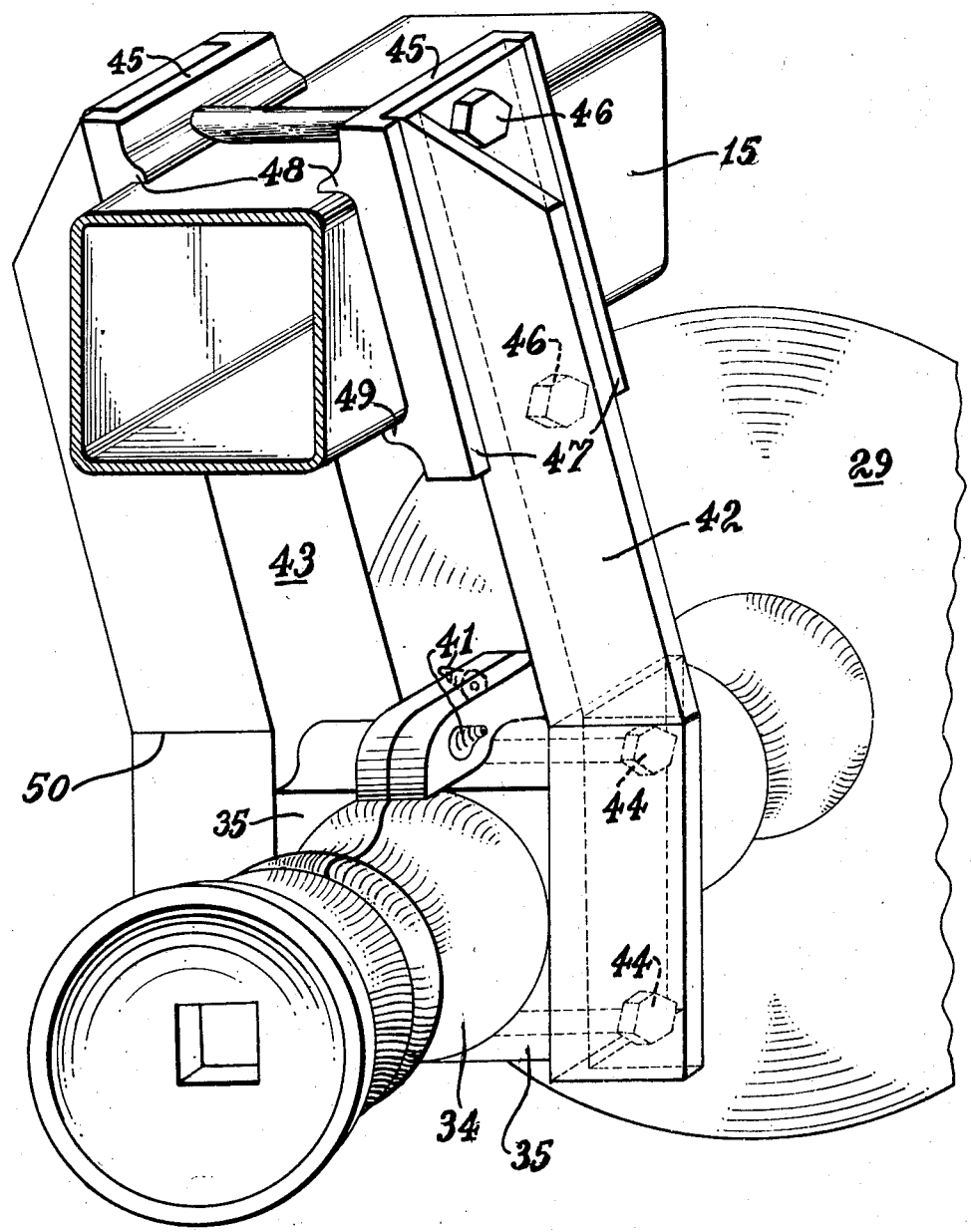

In the drawings, wherein like symbols refer to like or corresponding parts throughout the several views, Figure 1 is a top plan view of a disc harrow machine constructed in accordance with the present invention, Figure 2 is a rear elevational view of the rear transverse beam and the gang assemblies thereon in one position of adjustment and spacing, Figure 3 is a side elevational view of the machine showing in full lines the ground wheels in the lowered position and raised in the dotted position, Figure 4 is a fragmentary top plan view with the discs removed to illustrate more particularly the front leveling device and the device for locking the ground wheels in adjusted position, Figure 5 is a vertical longitudinal sectional view taken on the line 5—5 in Figure 4, Figure 6 is an enlarged fragmentary perspective view with the tubular frame shown in section, illustrating more particularly the clamp or adjustable mounting for the gang assemblies, Figure 7 is a perspective view of a form of frame employed, Figure 8 is a view similar to Figure 2 showing one of the gangs partly in section to illustrate the bolt, bearing and spacing sleeve arrangement, and Figure 9 is an enlarged sectional view taken through the bearing and bearing spool.

Figure 10 is a perspective view of the fixed bracket mounted upon the abutment block showing a portion of the thrust rod extending therefrom.

Referring more particularly to the drawings, 10 and 11 designate central longitudinal beams which are spaced apart and in substantially paralled relation, and 12 and 13 represent forward beams extending respectively in substantial alignment with the central beams 10 and 11.

These beams 10, 11, 12, 13 are intersected by front and rear transverse disc beams 14 and 15 which may for example be set in the angular relation illustrated in Figure 1, or in any other desired relationship.

Extending across between the central longitudinal beams 10 and 11 at the after portion of the frame are spaced angle or cross bars 16 and 17 and flat or other diagonal braces 18 and 19 which may be welded or otherwise secured to the cross bars 16, 17 at or near the outer ends thereof. The cross bars 16, 17 and diagonal braces 18, 19 are for the purpose of receiving a weight box (not shown) or may be considered as the weight box for receiving desired weights such as large rocks, masonry blocks, sand bags, etc.

It will be seen that the main frame is made of only ten tubular pieces of which the members 10, 11, 12, 13, 14, 15, 63 and 82 are steel tubing square in cross section as shown more particularly in Figure 7. A satisfactory size has been found to be 4" x 4" with a well thickness of the order of 3/16". The various members of the main frame are cut to size and welded together. The result is a rigid, all welded, one-piece frame, light in weight, durable in strength, without the use of additional bracing. The dropped pieces 82 are welded to the bottom of members 10, 11 and carry the bearing 24 for the shaft 23. The hitch drop piece 63 and the other drop pieces 82 to which bearings 24 are fastened are also of square tubing. A one-fourth steel plate is welded to the bottom of the bearing drop and the split bearings 24 are bolted to the plate with one bolt front and rear. As an alternate means for construction longitudinal pieces 10, 12 and 11, 13 each could be one continuous member and transverse beam 14 could be in three sections and the resulting frame would be essentially the same.

It will be seen, particularly from Figure 7, that the transverse beam 14 is interposed between the adjacent ends of longitudinal beams 10, 12 and 11, 13 while the rear transverse beam 15 is welded onto the rear ends of the central longitudinal beams 10, 11. It will also be noted that the transverse beams 14, 15 are so incorporated in the frame structure along with the longitudinal beams that the top and bottom surfaces of the transverse disc beams are substantially flush with the top and bottom surfaces of the longitudinal beams. All parts of the frame are coplanar. The frame proper is novel in the simplicity of its design, the use and economy of fabrication, its light weight yet rugged strength without the use of braces. Such frame has also a trim and appealing appearance. By incorporating the square tubing as a complete harrow frame there has been eliminated the necessity of any subframe or additional framework.

The harrow frame is lifted from the ground and the depth of cutting regulated with the pneumatic or other wheels 20. As hydraulic pressure from the hydraulic pump on the tractor (not shown) is applied to the hydraulic cylinder 21, the piston rod 21ª transmits the power to the wheel axle lever 22 which is welded or otherwise affixed to the wheel axle shaft 23 journaled to the frame by means of the dropped pieces 82 and bearings 24. The turning action of the shaft 23 raises or lowers the wheels 20 which are journaled on the wheel spindles 81, one end of each spindle being made fast to the lower end of its wheel arms 25. When the wheels are in the lowered position the harrow is raised from the ground as shown in the full line position in Figure 3.

A lever 26 is also welded or otherwise affixed to the shaft 23 so that it rotates with the shaft. Such lever is a locking lever and it swings through a quadrant 27 which is welded or otherwise affixed to the frame member 11. The holes 27a permits several depth settings of the harrow on the wheels 20 by inserting a pin 28 through the proper holes in back of the adjusted lever 26 so that such lever 26 may rest against the pin 28.

Referring more particularly to Figures 2, 6, 8, and 9, the discs 29 are mounted in gangs in novel assemblies in which a number of the discs 29 are mounted upon a square or other bolt or shaft 30 having a head 31 at one end and a threaded shank at the other end for receiving the nut 32 to retain the discs on the bolt with spacing sleeves 33 therebetween. The sleeves 33, discs 29, as well as the bearing spools 34, are slidable on the bolt 30 and removable therefrom when the nut 32 is removed.

The bearing spool is shown more particularly in Figures 6, 8 and 9 as having a square bore therethrough conforming to the cross-section of the bolt 30 so as to rotate therewith. The spool or spools 34 are rotatably journaled in two-part or divided bearing blocks 35 having inner annular grooves 36 for the thrust rings 37 of the spools 34 and outer grooves 38 for the dirt rings 39 of the spools.

The bearing blocks have transversely extending bolt holes 40 therethrough and lubricating connections 41 as more particularly seen in Figure 6. The divided bearing caps, or bearing blocks, of which there are two to each bearing assembly, are identical, and are interchangeable. Each half has a lubrication passage 79 from the lubrication fitting that directs the lubricant to both sides of each thrust ring 37. Thus both thrust rings are thoroughly lubricated on both sides, each one receiving its lubricant from one of the halves of the bearing caps or bearing blocks. There is only one lubricating fitting 41 to each half of the bearing caps or blocks. The bearing blocks 35 are supported in the lower ends of standards 42 and 43 which are bolted to the bearing blocks by means of bolts 44. The standards may be of angle iron construction for strength.

At the upper ends the standards 42 and 43 are slidably and adjustably mounted upon the disc carrying beams 14 or 15, and for this purpose clamp plates 45, are secured by the bolts 46 to the upper end portions of the standards 42, 43. As shown in Figure 6 the bolts 46 extend above and below the beam 15 and pass through both standards and clamp plates 45. The clamp plates have outwardly extending upright flanges 47 along their longitudinal vertical edges to receive the upper portions of the standards 42, 43 therebetween and inwardly extending upper and lower horizontal shoulders 48 and 49 to slide against the upper and lower surfaces of the beams 14, 15. Inwardly of and adjacent to the shoulders, the plates 45 have formed thereon rounded portions which are complemental to and contact the rounded edge portions of the transverse disc beam so that the tightening of the bolts 46 causes the rounded portions of the plates to bite into the rounded portions of the beam.

As shown in Figure 2 a gang assembly includes at least two bearings 35 with standard and clamp supporting and adjusting devices.

By loosening the bolts 46 the clamps 45 may be slid along the disc carrying transverse beams 14 and 15 without any interference from the braces usually necessary in agricultural frame structures. In other words, viewing the machine from the standpoint of Figure 1 it will be seen that the clamps may be slid substantially the entire length of the transverse beams 14 and 15 with the exception of those narrow areas required for attaching the transverse beams 14 and 15 to the longitudinal beams of the framework. The elimination of any braces on the frame permits a large range of adjustment of the clamps over those lengths of the transverse beams 14 and 15 which extend within the longitudinal members of the frame and also those portions which extend beyond the sides of the frame. This is all accomplished without perforating the transverse beams 14 and 15 or otherwise changing or altering their construction or weakening them in any respect. The clamps are not dependent for position on any cooperating or complemental structure or parts of the transverse beams 14, 15 and therefore these clamps may be adjusted along these beams through fractional inch changes in order that the standards 42, 43 may take up a correct position with respect to the bearings they are to support.

This method of mounting permits a variation of disc spacing, number of discs, number of bearings and disc sizes or combinations of these various items to be used on one basic frame without change or adjustment to the frame for such changes in gang assemblies and adjustment thereof. For instance, one harrow frame may be used as a heavy cutting harrow and with a quick change of gangs with closer disc spacing, the same frame may be used as a smoothing harrow.

The disc gangs on the improved harrow are easily and quickly attached and detached. The bearings 35 on the disc arbor bolts 30 have the same cross-sectional widths as the frame tubing 14, 15 plus the widths of the clamp plates 45 which enables the standards 42 and 43 to be brought down in a straight line and without bending from the clamps 45 to the bearing blocks 35. In other words, the standards 42, 43 fit snugly up against the clamps 45 and also against the sides of the bearing blocks 35 to which they are bolted by the bolts 46, 44 respectively. Thus the standards have only one bend 50 therein in one direction only which is that corresponding to the concavity of the adjacent disc 29.

On this one harrow frame, without any changes or alterations discs ranging from 18" diameter to 24" diameter may be used with any one or combination of four spacings, 6", 7½", 9" or 10". Therefore, it will be readily seen that a large number of disc size, disc spacing and cutting width combinations can be accomplished with one basic frame. In actual practice, the one basic frame may be equipped with one of over one hundred combinations, any one of which can be furnished the customer by the dealer within a very short time simply by having on hand four different lengths of spacers, three different diameter sizes of discs and a complete assortment of five different gang bolt lengths in stock. Obviously the invention lends itself to the use of other types of harrows which differ in principle and design. The novel disc gang assembly and its method of bearing support and adjustment thus provide great advantages in production as well as in maintenance and supply because of the unusually large interchangeability of parts.

At the front end of the frame there is provided a hitching clevis 51 having vertically elongated plates 52 with series of perforations 53 therein to receive therebetween the forward end of the tongue 54 which may be pivoted in any set of the perforations by a pivot pin connection 55. The rear end of the tongue is affixed to a draw bar 56 having trunnions 57 for rotary movement in appropriate forward parts of the frame. The draw bar is provided with a number of perforations or holes 58 along its length and a diagonal brace 59 has its rear end secured by a pin 60 in any selected perforation. The forward end of the brace 59 is selectively connected by a pin 61 to one of a series of perforations or holes 62 made in the forward portion of the tongue 54. The rear end of the tongue is also perforated to receive a pin 54a by which it is selectively connected to the draw bar 56 at any one of the perforations or holes 58.

The trunnions 57 are shown in Figure 5 as journaled in dropped bearing brackets 63 so that the pivotal axis of the draw bar 56 which is substantially horizontal is substantially below the plane of the frame.

An upstanding arm 64 is affixed to the draw bar 56 preferably at a central position thereof. To the upper end of this arm 64, there is connected a clevis 65 as by a pivot pin 66. The clevis is affixed to the forward end of a thrust rod 67 slidable freely at its rear end through a fixed bracket 71. This bracket 71 may be made of a piece of angle iron with a hole in one side for the rod 67, the other side being welded or otherwise secured to an abutment block 74 in the position shown in Figure 5. The bracket may be connected to any suitable part of the framework. In Figure 5 it is shown to be mounted upon the abutment block 74 to which the hydraulic cylinder 21 is pivoted as indicated at 75. A helical spring 69 is coiled about the thrust rod 67 between the washer 70 and the fixed bracket 71. The forward washer 70 abuts against an adjusting nut 72 in threaded engagement with a threaded forward section 73 of the thrust rod.

The adjusting collar 68 has two threaded set screws 80 which position the collar at any desired location on the thrust rod 67 behind the fixed bracket 71. This slidable collar acts as a stop behind the bracket 71 and regulates the action of the spring 69. The spring, therefore, cannot tilt the frame about its pivot point more than that allowed by the setting of the collar 68. When collar 68 is moved toward the clevis end of the thrust rod and set, the tilt of the frame from the level position in the wheels will be forward. When moved toward the rear end of the thrust rod and set, the tilt of the frame, from the level position on the wheels, will be toward the rear. When the level position of the frame on the wheels is desired the collar is set on the rod to maintain this position.

It will be understood that the hitching clevis 51 is coupled to the tractor hitch which is at a fixed elevation for each particular type of tractor. Any inequalities in hitch elevation can be compensated for by adjusting the pin 55 which connects the tongue 54 with the clevis 51 in the perforations 53 which are most suitable from a ground elevation standpoint. In this way the frame may be roughly leveled to desired horizontal or tilting position. As the wheels 20 are raised or lowered the front end of the frame will tend to rotate about the hitching pin 55 due to the fact that the frame is raised and lowered with the wheels 20 incident to the adjustment of penetration of the discs 29 into the ground. As the frame is thus raised and lowered the tongue 54 will tend to rotate about the center 55 which can only be accomplished by similar rotation of the draw bar 56 about the axis of its trunnions 57. As the frame is lowered therefore the upstanding arm 64 will be rotated clockwise as viewed in Figure 5 pushing the thrust rod 67 rearwardly with its rear end portion sliding freely through the bracket 71. Incident to this movement the nut 72 and the washer 70 will be moved rearwardly with the thrust rod while the rear end of the coil spring 69 is held immovable by the stationary bracket 71. The spring will accordingly be compressed and the load of the spring will be transmitted to the forward portion of the frame tending to lift this front end of the frame with respect to the wheel spindles or the point of wheel to ground contacts about which the frame as a whole pivots. The frame cannot pivot about the axle 23 because the two are fastened together as an integral unit by the cylinder. As the frame pivots the axle must turn also a corresponding amount in the same direction. The pivot point is around the wheel spindle 81 or point of wheel ground contact; in most instances the former.

When the ground wheels 20 are lowered and the frame raised, the arm 64 will be moved counterclockwise and the tension on spring 69 will be progressively withdrawn which will also tend to preserve the horizontal alignment of the frame.

The main purpose of the leveling device is to maintain a level frame in any position of the setting of the ground wheels 20 so long as the whole load or part of the load is supported by the wheels 20 and it is desired to have a level frame. The mechanism is so designed to maintain a level position when it is adjusted for a level position. The adjustment may be made by the nut in varying the load of the spring. As a secondary feature, the frame may be tilted from the level forward or backward and the tilt will remain relative at any of the wheel settings. This tilt may also be adjusted by adjusting the tension of the spring through the nut. Where tractors are used having different hitching point heights the desired adjustment for level frame or tilted frame may be had.

The ground wheels 20 may be raised or lowered and in doing so the frame is correspondingly raised or lowered. The frame may also tilt about the ground wheels which are substantially centrally of the frame. The forward end of the tongue becomes a fixed point when the clevis is attached to the tractor. This fixed point may of course pivot but it cannot shift on a motion of translation. The leveling spring will resist the tendency of the frame to tilt about the ground wheels when such spring is adjusted for this purpose. The load of the spring is adjusted by the nut and such load may be adjusted or regulated to compensate for loads of the implement gang assembly and other load carried by the frame.

Referring more particularly to Figure 1 the holes 58 in the draw bar and the corresponding holes in the tongue 54 and tongue-draw bar brace 59 with their pins are for the purpose of offsetting the implements to right or left of the center of pull of the tractor or center of draft of the implement. The purpose for offsetting is to cover the wheel mark of a wide tread tractor, to get under low hanging branches of trees, to get near fences with the implement, etc. This offsetting is accomplished by moving the tongue along the draw bar 54 to the desired hole 58. The hole in the front end of brace 59 lines up with one of the three holes 62 in the forward end of the tongue 54. This adjustment is illustrated in Figure 1 by the full and dotted line position of the tongue and brace as shown. The draw bar 54 moves from center to right in steps which offsets the implement to the left. The opposite effect may be accomplished by placing the brace piece on the right side of the tongue and moving the tongue from center to left of the draw bar 56.

A hydraulic hose 76 extends from the tractor to cylinder 21 and extends through a hose support 77.

Disc scraper assemblies 78 as shown in Figure 1 are optional equipment and may be clamped to members 14 and 15 when used.

Although I have disclosed herein the best form of the invention known to me at this time, I reserve the right to all such modifications and changes as may come within the scope of the following claims.

What is claimed is:

1. A frame for agricultural machines and the like comprising sectional longitudinal members of differential lengths, implement-carrying transverse members one of which is interposed between the sections of the longitudinal members adjacent the front end of the frame and welded at opposite sides to adjacent ends of the longitudinal members, the other of said transverse members being secured to the rear ends of the longitudinal members, and cross bar members secured to the inner walls of the longitudinal members between said transverse members and longitudinally spaced therefrom, all said members being in substantially the same plane and welded together with ends of the transverse members projecting beyond the sides of the longitudinal members, all said members being tubular and of polygonal cross section.

2. A frame for agricultural machines comprising spaced apart longitudinal members, an implement-carrying transverse member extending between the longitudinal members and connected to the longitudinal members at only two points with the ends of the transverse member projecting beyond the sides of the longitudinal members to provide a free board along the entire length of the transverse member, except at its two points of connection to the longitudinal members, bearings for an implement gang, means slidable along the transverse member for carrying the bearings, and means for clamping the slidable means to the transverse member at any point along the free board thereof.

3. A frame for agricultural machines comprising spaced apart longitudinal members, an implement-carrying transverse member extending between the longitudinal members and connected to the longitudinal members at only two points with the ends of the transverse member projecting beyond the sides of the longitudinal members to provide a free board along the entire length of the transverse member, except at its two points of connection to the longitudinal members, clamp plates adapted to be slidably engaged with the transverse member at any point along its free board and having outwardly extending flanges along their side edges, standards having their upper end portions received between said flanges, means to bind the standards to the plates and to bind the plates to the transverse member, bearings carried by the standards, a shaft journaled in the bearings, and implements on the shaft.

4. A frame for an agricultural machine comprising at least four tubular flatsided members two of which constitute longitudinal runners and two of which are arranged transversely of said runners to intersect the longitudinal runners at angles for carrying soil working implements thereon, all four of said members lying in the same plane, implement attaching means carried by said transverse members and being slidable therealong, and clamping means carried by said implement attaching means and being movable with said attaching means along said transverse members for retaining said implement attaching means at any desired point along said transverse members.

5. A frame for an agricultural machine as claimed in claim 4 wherein said clamping means comprises a pair of opposed bracket clamp members having lips overlying and underlying said frame transverse members and means associated with said clamp members to urge said members in clamping engagement with said transverse members.

6. A frame for an agricultural machine as claimed in claim 4 wherein said implement attaching means comprises a pair of spaced apart angle iron members having an implement bearing secured at their lower end.

References Cited in the file of this patent

UNITED STATES PATENTS

| | | |
|---|---|---|
| 1,365,013 | Wright | Jan. 11, 1921 |
| 1,830,761 | Johnson et al. | Nov. 10, 1931 |
| 1,861,626 | Flatley | June 7, 1932 |
| 1,963,426 | Taylor | June 19, 1934 |
| 2,029,250 | Noell | Jan. 28, 1936 |
| 2,320,742 | Newkirk | June 1, 1943 |
| 2,424,185 | Morkorski | July 15, 1947 |
| 2,430,434 | Rutter | Nov. 4, 1947 |
| 2,452,710 | Allen | Nov. 2, 1948 |
| 2,464,615 | Seawall | Mar. 15, 1949 |
| 2,494,115 | Bock et al. | Jan. 10, 1950 |
| 2,562,486 | Denning | July 31, 1951 |
| 2,599,084 | Archer et al. | June 3, 1952 |
| 2,637,564 | Stratman | May 5, 1953 |
| 2,640,718 | Brown | June 2, 1953 |
| 2,655,088 | Charley | Oct. 13, 1953 |
| 2,684,021 | Ratzloff | July 20, 1954 |
| 2,693,748 | Kiser | Nov. 9, 1954 |
| 2,717,479 | Scheidenhelm et al. | Sept. 13, 1955 |

FOREIGN PATENTS

| | | |
|---|---|---|
| 516,434 | Great Britain | Jan. 2, 1940 |
| 572,240 | Great Britain | Sept. 28, 1945 |